Figure 1:
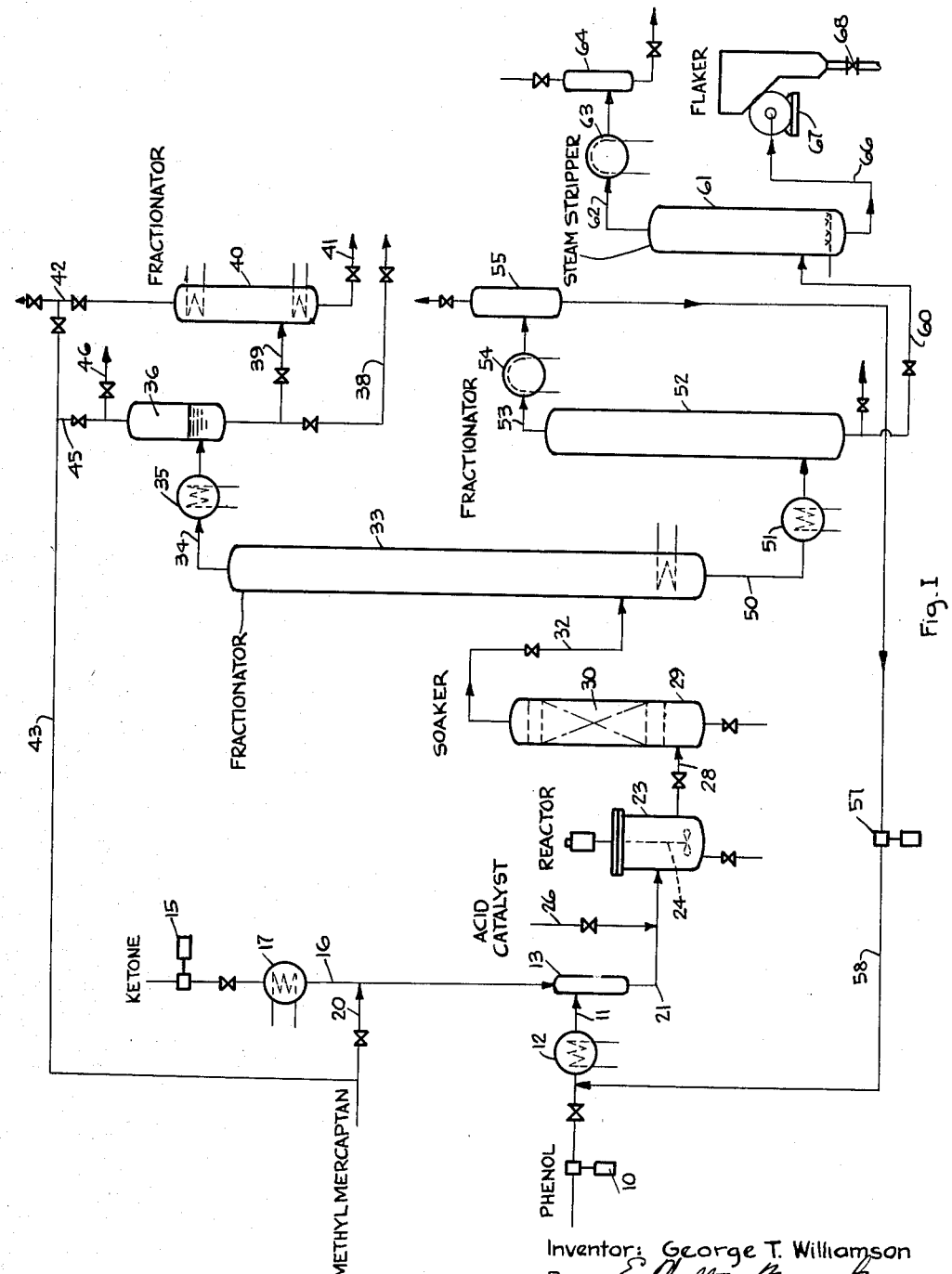

Jan. 10, 1956 G. T. WILLIAMSON 2,730,552
PRODUCTION OF BIS DI- (HYDROXYARYL) SUBSTITUTED COMPOUNDS
Filed Aug. 25, 1952 2 Sheets-Sheet 1

Inventor: George T. Williamson
By: E. Walter Mark
His Agent

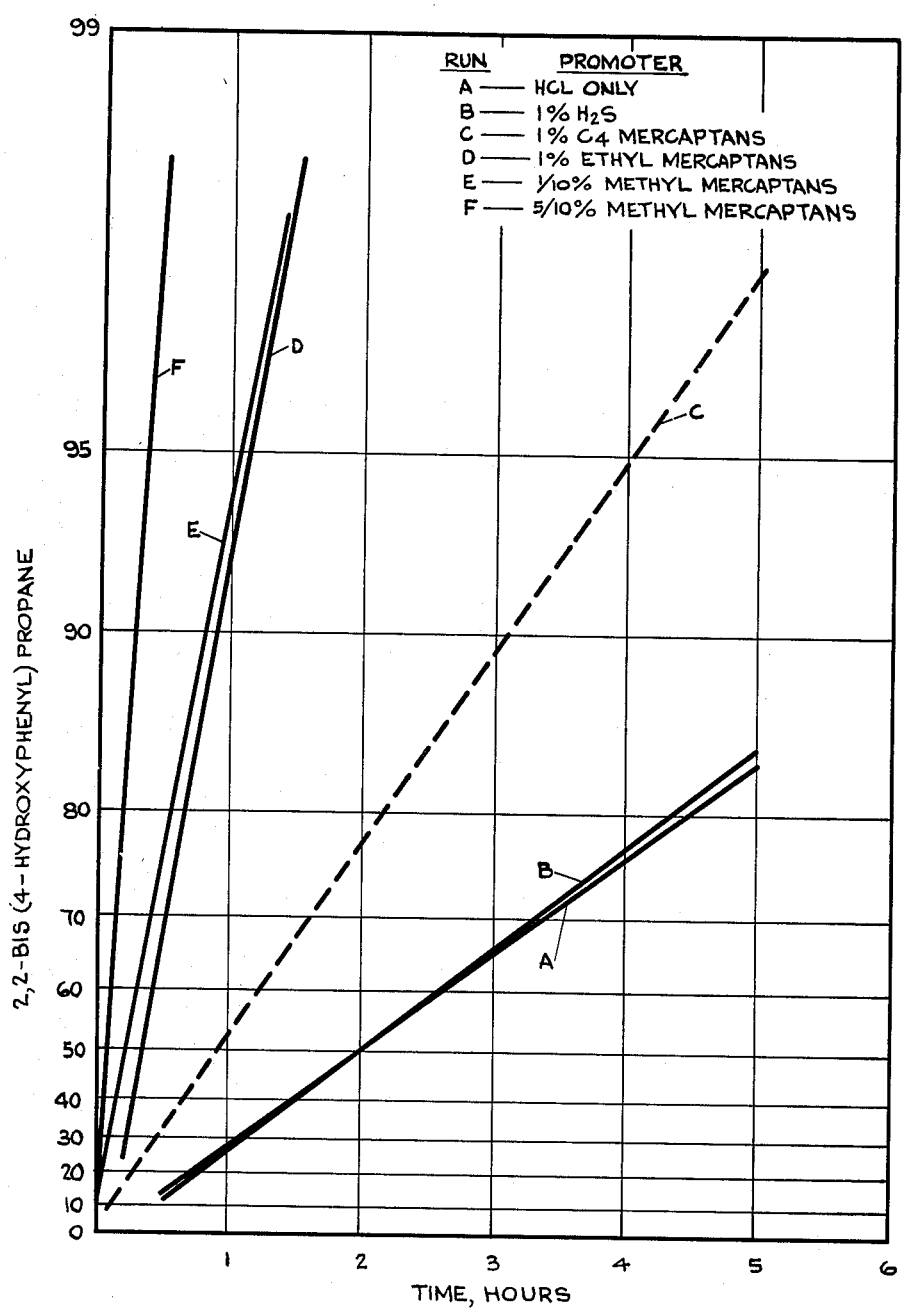
Fig. II

United States Patent Office 2,730,552
Patented Jan. 10, 1956

2,730,552

PRODUCTION OF BIS DI-(HYDROXYARYL) SUBSTITUTED COMPOUNDS

George T. Williamson, Oakland, Calif., assignor to Shell Development Company, Emeryville, Calif., a corporation of Delaware Application August 25, 1952, Serial No. 306,172

9 Claims. (Cl. 260—619)

This invention relates to the production of bis di-(hydroxyaryl) compounds and relates more particularly to the production of hydroxyphenyl-substituted alkanes wherein the nuclei of two phenolic radicals are directly attached to a single carbon atom in the alkyl group. A particular aspect of the invention relates to the production of gem di-(hydroxyphenyl) propane.

Hydroxyphenyl-substituted compounds such as, for example, the hydroxyphenyl-substituted alkanes are of great value in many important fields of application. They are employed as starting and intermediate materials in the production of a wide variety of organic products. Methods for their production disclosed heretofore generally involve the condensation of a phenolic compound with a carbonyl compound, for example, a ketone, in the presence of an acid condensation catalyst. Many of the processes disclosed heretofore generally involve the use of conditions wherein the contact time must of necessity be of such duration as to render highly impractical any large scale operation thereof. Contact times in the order of from about ten to about sixteen hours and even higher were often required. Serious disadvantages resulting from long periods of contact time unavoidably encountered in such processes include production of by-products to an inordinate degree as well as substantial product disintegration. As a result, the desired bis(hydroxyaryl) compound is contained in a relatively complex reaction mixture from which it is separated in a sufficiently high degree of purity only with great difficulty and at relatively high costs. The application to such methods of continuous operation, essential to efficient production of the desired material on a relatively large scale, is, therefore, generally highly impractical.

In order to overcome difficulties inherent in such processes it has been suggested to add certain materials as promoters for the reaction. Materials suggested comprise certain normally liquid or solid sulfur-containing compounds as well as hydrogen sulfide. Some of these materials do enable a degree of reduction in the contact time. However, the reduction in contact time is generally hardly sufficient, and often is accompanied by difficulties which offset any advantages. A serious disadvantage inherent in the use of many of the normally liquid and solid materials suggested as promoters heretofore resides in the fact that they are often removable only with difficulty, if at all, from the resulting reaction mixture containing them, thereby additionally complicating the already complex problem of product separation. The ability to use the bis(hydroxyaryl) compounds in many fields of application, and particularly in the field of resin manufacture, is often dependent upon their purity. Since compounds disclosed heretofore as capable of promoting the condensation reaction are generally highly undesirable contaminants in the resulting product, their use, particularly in view of the difficulty with which they are separated from the reaction mixture, contributes to aggravation of product contamination. Normally gaseous materials such as hydrogen sulfide comprised in compounds disclosed heretofore as capable of functioning as promoters for the condensation reaction, are often ineffective in reducing the contact times when employed in quantities and at conditions commensurate with practical scale operation.

It is an object of the present invention to provide an improved process enabling the more efficient production of bis(hydroxyaryl)-substituted compounds wherein the above difficulties are obviated to at least a substantial degree. A further object of the invention is to provide an improved process enabling the more efficient production of the desired bis(hydroxyaryl)-substituted compounds by the condensation of a phenol with a carbonyl compound wherein the desired bis(hydroxyaryl)-substituted compounds are obtained in a relatively high degree of purity with substantially reduced contact time and a minimum operative steps. A still further object of the invention is the provision of an improved process enabling the efficient production in a continuous operation of bis(hydroxyphenyl) alkanes. A particular object of the invention is an improved process enabling the efficient production in a continuous operational procedure of gem di-(hydroxyphenyl) propane by the acid catalyzed condensation of phenol with acetone. Other objects and advantages of the invention will become apparent from the following detailed description thereof.

It has now been found that difficulties generally inherent in many of the processes for the production of bis-(hydroxyaryl)-substituted compounds by condensation of a carbonyl compound with a phenol are obviated substantially completely by executing the acid-catalyzed reaction in the presence of a normally gaseous promoter consisting essentially of methyl mercaptan.

Methyl mercaptan is unique in its ability to promote the acid-catalyzed condensation of phenolic compounds with carbonyl compounds. It is distinguished in this regard from materials suggested heretofore not only because of its ability to reduce to a surprising degree the time of contact, but because it enables such substantial reduction in contact time to be attained with the use of only a minimum amount of promoter in the absence of any substantial amount of by-product formation or product disintegration. Such absence to any substantial degree of by-product formation and product disintegration enables the process to be carried out in a continuous method with the production of a reaction mixture from which the desired bis(hydroxyaryl) compound, as well as charge components suitable for recycling, are separated in a relatively high degree of purity with a minimum of operative steps.

The relatively small amounts of methyl mercaptan which need be employed to obtain substantial reduction in contact time, and the ease with which this highly volatile compound is removed unaltered from the resulting reaction mixture, contribute materially not only to avoidance of product contamination but to reduction in cost of catalyst as well as overall operation.

In accordance with the present invention bis(hydroxyphenyl) alkanes such as, for example, gem di-(hydroxyphenyl) propane, are produced by the acid-catalyzed interaction of acetone and phenol in the presence of added methyl mercaptan in the liquid phase at a temperature of from about 20° C. to about 110° C.

Phenolic compounds reacted with carbonyl compounds to obtain the bis(hydroxyaryl) compounds in accordance with the invention comprise the broad class of phenolic compounds having at least one replaceable hydrogen atom directly attached to a nuclear carbon atom of the phenolic radical. By the term "phenolic compounds" as used herein and in the appended claims is meant those organic compounds containing an aromatic radical and one hydroxyl group, said hydroxyl group being linked directly to a carbon atom contained in the nucleus of an aromatic radical. The phenolic compounds, as a class, employed as starting material in the production of bis(hydroxyaryl) compounds in accordance with the invention comprise the simplest member of the class, phenol, and the homologues and substitution products of phenol containing at least one replaceable hydrogen atom directly attached to a nuclear carbon atom in the phenolic radical. Suitable phenolic compounds comprise those wherein hydrogen atoms of the aromatic phenolic nucleous have been substituted by hydrocarbon radicals, such as alkyl, cycloalkyl, aryl, alkaryl and aralkyl groups. Suitable phenolic compounds include among others the following: phenol, the cresols, the xylenols, thymol, carvacrol, cumenol, 2-methyl-6-ethylphenol, 2,4-dimethyl-3-ethyl-phenol, 4-ethylphenol, 2-ethyl-4-methylphenol, 2,3,6-trimethylphenol, 2-methyl-4-tertiarybutylphenol, 2,4-ditertiarybutylphenol, 4-methyl-2-tertiary-butylphenol, 2-tertiary-butyl-4-methyl-phenol, 2,3,5,6-tetramethylphenol, 2,6-dimethylphenol, 2,6-ditertiary-butylphenol, 3,5-dimethylphenol, 3,5-diethylphenol, 2-methyl-3,5-diethyl-phenol, o-phenylphenol, p-phenylphenol, the naphthols, phenanthrol, their homologues and analogues. Suitable phenolic compounds comprise those containing more than one phenolic group in each nucleus as well as polynuclear compounds having one or more than one phenolic group in each nucleus. Mixtures of the above compounds may be used as the starting phenolic reactant. Mixtures of phenolic compounds such as found in commercial products, such as cresylic acid, e. g. petroleum cresylic acids, and the like, may serve as the phenolic starting material of the process within the scope of the invention.

Phenolic compounds leading to products of particular value in many fields of application comprise those having a total number of carbon atoms in the range of, for example, from 6 to about 20, and wherein individual substituent hydrocarbon groups contain from one to about 12 carbon atoms.

The class of carbonyl compounds reacted with a phenolic compound in the process of the invention is represented by the empirical formula:

wherein $R^1$ represents a member of the group consisting of any monovalent organic radical, aliphatic, cycloaliphatic, aromatic, heterocyclic, including hydrocarbon radicals such as alkyl, cycloalkyl, aryl, aralkyl, alkaryl, including saturated and unsaturated groups; and $R^2$ represents a member of the group consisting of hydrogen and any monovalent organic radical, aliphatic, cycloaliphatic, aromatic, heterocyclic, including hydrocarbon radicals such as alkyl, cycloalkyl, aryl, aralkyl, alkaryl. The suitable carbonyl compounds comprise the ketones and aldehydes. Examples of such suitable ketones and aldehydes comprise dimethyl ketone, methyl ethyl ketone, diethyl ketone, dibutyl ketone, methyl isobutyl ketone, cyclohexanone, propionylphenone, methyl- and amyl-ketone, mesityl oxide, cyclopentanone, acetophenone and acetaldehyde, propionaldehyde, butyraldehyde and benzaldehyde.

The specific carbonyl compound employed as starting material will depend upon the specific bis(hydroxyaryl) compound desired and may be governed to some extent by specific operating conditions employed. Particularly suitable compounds comprised in the above-defined class of carbonylic compounds comprise the aliphatic ketones and aldehydes having from three to fourteen carbon atoms to the molecule.

The reaction of the phenolic compound with the carbonyl compound in accordance with the invention is executed in the presence of an acid-acting catalyst such as, for example, a hydrogen halide such as hydrogen chloride, preferably in the anhydrous state. The use of the hydrogen chloride in amounts ranging from about 0.5 to about 20% by weight and preferably from about 3 to about 6% by weight based upon the yield of bis(hydroxyaryl) compound has been found satisfactory. Greater proportions of hydrogen chloride may, however, be employed within the scope of the invention. Maintenance of a desired concentration of hydrogen chloride in the reaction mixture may be controlled by the use of superatmospheric pressure and/or the use of an appropriate solvent.

Although hydrogen chloride is chosen as a preferred catalytic agent the process of the invention is in no wise limited to the use of only this active agent. Acidic agents comprising any strong mineral acid and acid-acting condensing agents such as, for example, sulfuric acid, hydrochloric acid, phosphoric acid, hydrobromic acid, hydrofluoric acid, nitric acid, acetyl chloride dimethylsulfate, sulfur dioxide, p-toluene sulfonic acid, boron trifluoride, boron trifluoride complexes and other acid-acting compounds comprising compounds which are hydrolyzed by water to form acids such as aluminum chloride, sulfonyl chloride, phosgene, etc. Of the strong acids those having a dissociation constant greater than $10^{-3}$, and particularly the strong mineral acids are preferred.

Essential to the attainment of the objects of the invention is the presence of the added methyl mercaptan during the execution of the reaction. The methyl mercaptan may be introduced into the system by solution in a portion, or all, of the carbonyl reactant to the process and/or by its direct introduction into the reaction zone. It may be introduced continuously or incrementally during the course of the operation. A particular advantage of the use of the methyl mercaptan resides in the ability to obtain surprisingly increased reaction rates with relatively small amounts of the methyl mercaptan. Amounts of methyl mercaptan ranging, for example, from as little as 0.01% to about 0.5% enable the attainment of increases in reaction rates bringing continuous operation in the production of the desired bis(hydroxyaryl) compounds by the acid-catalyzed condensation of phenols with carbonyl compounds within the realm of practicability. The optimum amount of methyl mercaptan to be employed will be governed to some extent by particular reactants as well as specific operating conditions employed. Amounts of methyl mercaptan ranging up to about 1% by weight based on theoretical yield in the case of gem-di(hydroxyphenyl) propane production generally suffice to obtain an increase in reaction rate commensurate with continuous operation. Higher amounts may, however, be employed within the scope of the invention. Methyl mercaptan introduced into the reaction zone need not necessarily be in essentially pure state. Thus, methyl mercaptan may be introduced into the system in admixture with a normally gaseous carrying medium or diluent, for example, an inert normally gaseous material such as a normally gaseous paraffinic hydrocarbon, nitrogen and the like. A suitable methyl mercaptan promoter comprises the methyl mercaptan-containing fractions separated from hydrocarbon mixtures of natural petroleum origin.

Reaction of the phenolic compound with the carbonyl compound in accordance with the invention is executed under conditions at which at least a substantial part of the reactants and reaction products are maintained in the liquid state within the reaction zone. The reactants are introduced into the reaction zone of the process under controlled conditions assuring a molecular excess of the phenolic compound over the carbonyl compound. In a preferred method of carrying out the invention the phenolic compound is maintained in substantial excess, for example, a ratio of phenolic compound to carbonyl compound of at least 3. In carrying out the process in continuous manner it has been found essential to efficient operation of the process to maintain the mole ratio of the phenolic component to carbonyl component at a value of at least 10:1. Thus, in a preferred method of carrying out the continuous process the ratio of phenolic component to carbonylic component is maintained in the range of, for example, from about 10:1 to about 25:1 and preferably in the range of from about 10:1 to about 15:1.

The process is executed at a temperature assuring the presence of at least a substantial amount of the reactants in the liquid phase. The specific temperature preferred will depend to some extent upon the nature of the specific reactants and other operating conditions employed. The use of temperatures sufficiently high to cause degradation of any substantial part of the reaction mixture, or the formation to any substantial degree of undesired by-products, is preferably avoided. Temperatures may range, for example, from about 20 to about 110° C. and preferably from about 45 to about 80° C. The process may be carried out at atmospheric, subatmospheric or superatmospheric pressures. In general the use of atmospheric pressure or a slightly elevated pressure assuring continuity of flow through the system of continuous operation, for example, up to about 50 pounds per square inch is preferred. Resort to the use of pressures above atmospheric is at times desirable to aid in the maintenance within the reaction zone of desired concentrations of a specific normally gaseous material such as, for example, hydrogen chloride.

The use of solvents which are relatively inert under the conditions of execution of the reaction such as, for example, water-immiscible organic compounds, for example, aromatic hydrocarbons such as xylene, toluene, chlorinated hydrocarbons; or, in the absence of such water-immiscible compounds the use of moderate amounts of water may be employed within the scope of the invention. It is to be pointed out, however, that a specific advantage of the process of the invention, employing continuous operation with a mole ratio of phenolic reactant to carbonyl reactant of at least 10:1 in the presence of the methyl mercaptan, resides in efficient operation without the need of added solvents or diluents.

The use of inert gaseous materials to aid in maintaining desired agitation of the reaction mixture within the reaction zone may be resorted to within the scope of the invention.

The time of contact may vary considerably within the scope of the invention. A particular advantage of the invention distinguishing the process from those available heretofore resides in the relatively short contact time required to obtain high yield based on the reactants charged. Thus, contact times within a range of from about 15 minutes to about two hours have been found ample to obtain yields ranging up to at least 90% of theoretical in the production of high purity 2,2-bis(4-hydroxyphenyl) propane. Longer or shorter contact times may, however, be employed within the scope of the invention.

The desired bis(hydroxyaryl) compound and unconverted reactants, such as phenol, are separated from the reaction mixture. Unconverted reactants such as, for example, phenolic compounds are recycled to the reaction zone. Normally gaseous materials comprising methyl mercaptan, as well as acid catalyst, are separated from reactor effluence and may be recycled in part or in entirety to the reaction zone. Suitable means comprising one or more such steps as, for example, stratification, distillation, solvent extraction, extractive distillation, adsorption, and the like may be resorted to in effecting the product separation.

Under the above-defined conditions the phenolic component and the carbonylic component of the charge to the process interact with the formation of a reaction mixture comprising bis(hydroxyphenyl) compounds. The bis(hydroxyphenyl) compounds obtained consist essentially of compounds wherein the nuclei of two phenolic radicals are directly attached by carbon-to-carbon linkage to the same single carbon atom in the alkyl group as represented by the following formula:

$$HO-Ar-\underset{\underset{R^2}{|}}{\overset{\overset{R^1}{|}}{C}}-Ar'-OH \quad (II)$$

wherein $R^1$ is a member of the group consisting of monovalent organic radicals including hydrocarbon radicals such as alkyl, cycloalkyl, aryl, alkaryl and aralkyl which may be saturated or unsaturated, and Ar—OH and Ar'—OH are phenolic radicals, and $R^2$ is a member of the group consisting of hydrogen and monovalent organic radicals including hydrocarbon radicals such as alkyl, cycloalkyl, aryl, alkaryl and aralkyl which may be saturated or unsaturated; and Ar—OH and Ar'—OH are phenolic radicals. In the bis(hydroxyaryl) alkanes represented by Formula II the radicals $R^1$ and $R^2$ have the same significance as in the above defined Formula I representing the suitable carbonylic starting materials. The phenolic radicals Ar—OH and Ar'—OH in the above Formula II will correspond to the phenolic radical obtained by the removal of hydrogen from a nuclear carbon atom of a phenolic component of the charge to the process. Hydroxyphenyl-substituted compounds, having a specifically desired composition and structure, are therefore obtained in accordance with the invention by the judicious selection of specific carbonylic and phenolic starting reactants. Thus, the interaction of unsubstituted phenol with an aliphatic ketone such as, for example, dimethylketone, will result in reaction products comprising gem (4-hydroxyphenyl) propane. The reaction products obtained will generally comprise isomeric forms of the bis(hydroxyaryl) compounds. Thus, the interaction of unsubstituted phenol with dimethyl ketone in accordance with the invention, the reaction products will comprise a mixture of bis(4-hydroxyphenyl) alkane and bis-(2-hydroxyphenyl) alkane, in which the former will generally greatly predominate.

The effectiveness of methyl mercaptan as a promoter in the process of the invention is not a property possessed by alkyl mercaptans in general. Ethyl mercaptan, a normally liquid material and the next higher homologue to methyl mercaptan, has been found to be the most active of other alkyl mercaptans. Even ethyl mercaptan, however, fails to approach in effectiveness the behavior of methyl mercaptan as a promoter in the process of the invention. The use of the normally liquid mercaptans, such as ethyl mercaptan, generally does not result in an activation permitting the efficient operation in a continuous manner. Higher alkyl mercaptans have been found to be even less effective than the ethyl mercaptan. The unique and unexpected behavior of methyl mercaptan with respect to its effectiveness as a promoter for the acid-catalyzed condensation of a phenol with a carbonyl compound is evidenced by the following examples:

*Example I*

2,2-bis(4-hydroxyphenyl) propane was produced by heating a mixture consisting of phenol and dimethyl ketone, containing a molar ratio of phenol to dimethyl ketone of 5.5:1, in the presence of added hydrogen chloride and methyl mercaptan, at a temperature of 60° C., for a period of 4 hours. The hydrogen chloride concentration in the reaction zone was maintained at approximately 6.0% based on the theoretical yield of 2,2-bis(4-hydroxyphenyl) propane. The methyl mercaptan added equalled only 0.05% based on theoretical yield of 2,2-bis-(4-hydroxyphenyl) propane. A yield of 2,2-bis(4-hydroxyphenyl) propane equal to 99% was obtained.

The operation was repeated under substantially identical conditions with the exception that ethyl mercaptan was substituted for the methyl mercaptan. The amount of ethyl mercaptan added was equal to twenty times by weight the amount of methyl mercaptan added in the comparative operation. Furthermore, the operation employing the ethyl mercaptan was permitted to proceed for an additional hour for a total of five hours. The yield of 2,2-bis(4-hydroxyphenyl) propane obtained was equal to only about 87% of the theoretical yield.

*Example II*

In an operation identified by the designation "A" 2,2-bis(4-hydroxyphenyl) propane was produced by heating a mixture containing phenol and dimethyl ketone in a molar ratio of phenol to dimethyl ketone of 10:1, in the presence of added hydrogen chloride and at a temperature of 65° C. Sufficient hydrogen chloride was added at the start of the reaction to obtain a partial pressure of hydrogen chloride of about one pound guage in the reactor. A sample of the reaction mixture was withdrawn from the reactor every 15 minutes throughout the operation. The sample removed was quenched upon removal with ice water and thereupon analyzed to determine its 2,2-bis(4-hydroxyphenyl) propane content.

The operation was repeated five times in five separate and distinct operations identified by the designations "B," "C," "D," "E," and "F," respectively, under substantially identical conditions with the exception that a sulfur compound was added to the reactor charge in each of the five operations. The nature of the sulfur compound added, and the amount in which it was added, are indicated for each of the separate operations in the following table:

| Operation | Sulfur compound added | Amount percent based on theoretical yield of bis-2,2(4-hydroxyphenyl) propane |
|---|---|---|
| A | None | None |
| B | H$_2$S | 1 |
| C | Butyl mercaptans | 1 |
| D | Ethyl mercaptan | 1 |
| E | Methyl mercaptan | 0.1 |
| F | ----do---- | 0.5 |

The yield of 2,2-bis(4-hydroxyphenyl) propane was plotted against the residence time for each of the separate operations. The resulting curves are set forth in Figure II of the attached drawings wherein each of the individual curves are identified by the reference characters A, B, C, D, E, and F, respectively, of the corresponding operations.

It is seen from the foregoing example that the use of methyl mercaptan in the amount of only 0.5% resulted in a yield of the desired 2,2-bis(4-hydroxyphenyl) propane of about 98.8% after only one-half hour of residence time, whereas under substantially identical conditions but with the exception that 1% of ethyl mercaptan was substituted for the 0.5% methyl mercaptan a yield of only about 70% was obtained. It is seen that the butyl mercaptans when employed in an amount of 1% result in a yield of only 30% under substantially equivalent conditions, and that hydrogen sulfide is relatively ineffective as a promoter for the desired reaction.

The process of the invention may be executed in batch or semi-continuous operation. A particular advantage of the invention, however, resides in the ability to produce efficiently the desired bis(hydroxyaryl) compounds in a continuous operation. In order to set forth more fully the nature of the invention as applied to the continuous production of the bis(hydroxyaryl) compounds it will be described in greater detail hereinbelow as applied to the production of bis(hydroxyphenyl) compounds such as, for example, gem di-(4-hydroxyphenyl) propane, by the condensation of phenol with dimethyl ketone with reference to the attached drawings wherein Figure I illustrates one form of apparatus suitable for carrying out the process of the invention and Figure II is a graph illustrating the effect of various compounds upon the reaction rate in the acid-catalyzed condensation of phenol with acetone.

Referring to the drawing, a phenol, for example, phenol emanating from an outside source, is forced by means of pump 10 through valved line 11, provided with preheater 12, into a suitable mixing zone. The mixing zone may comprise any suitable means such as, for example, a pipe, or a chamber 13 enabling admixture of charge components to the system. A carbonyl compounds such as, for example, dimethyl ketone emanating from an outside source, is forced by means of pump 15 through valved line 16, provided with indirect heat exchanger 17, into chamber 13. A normally gaseous stream comprising methyl mercaptan is passed through valved line 20 into line 16. Within chamber 13 the phenol, dimethyl ketone and methyl mercaptan are admixed by passage of the charge components therethrough. From chamber 13 the mixed charge is passed through line 21 into a suitable reaction zone.

The reaction zone may comprise a suitable reactor, for example, an elongated zone of restricted cross-sectional area such as a coil or a tubular reactor, and/or a zone of enlarged cross-sectional area such as, for example, a chamber. A suitable reaction zone comprises a reactor 23 provided with suitable means for maintaining the contents thereof in a state of agitation such as, for example, a stirrer 24.

Acid catalyst such as, for example, hydrogen chloride, is passed through valved line 26 into line 21 entering reactor 23. Addition of the acid catalyst to the charge preferably is made immediately prior to entrance of the mixed charge into reactor 23. Since in the presence of the methyl mercaptan promoter the reaction will be initiated substantially immediately upon contact with the acid catalyst the presence of the acid catalyst in any substantial portion of the equipment preceding the reactor is preferably avoided. A part or all of the acid catalyst may be introduced as a separate stream directly into reactor 23. The introduction of phenol and dimethyl ketone into the system is controlled to maintain the ratio of phenol to dimethyl ketone in the mixture entering reactor 23 at about 10:1 or higher, for example, in the range of from 10:1 to about 20:1 and preferably from about 10:1 to about 15.

Methyl mercaptan is introduced in controlled amounts to maintain its concentration in the reactor in the range of from about 0.25 to about 1.0% by weight; based on theoretical yield of 2,2-bis-(p-hydroxyphenyl) propane.

Hydrogen chloride introduction is controlled to maintain its concentration in reactor 23 in the range of about 1 to about 12% by weight; and preferably from about 3 to about 6% by weight; based on theoretical yield of desired product. The temperature within the reactor is maintained in the range of from about 55 to about 80° C. and preferably from about 60 to about 65° C. Under the above-defined conditions phenol and dimethyl ketone react within reactor 23 with the formation of reaction products comprising bis di-(hydroxyphenyl) propane consisting essentially of 2,2-bis-(4-hydrophenyl) propane.

Effluence from reactor 23 may be passed in part or in its entirety directly to a product separating zone. It has been found, however, that substantial advantages, enabling continuous operation to proceed efficiently with high yields, are obtained by passage of the reactor effluence to a soaking zone prior to its passage to the product separating zone. Thus, products from reactor 23 are preferably passed through valved line 28 into a suitable soaking zone. The soaking zone may comprise one or more zones of enlarged cross-sectional area such as a chamber, column or tank and/or one or more elongated zones of restricted cross-sectional areas such as, for example, a coil or a tube bundle.

Means are preferably provided to maintain the reactor effluence in an agitated state within the soaking zone to aid in removal of the heat of reaction. Conventional means to obtain such agitation of the reactor effluence within the soaking zone such as, for example, the use of inert packing material, the maintenance of turbulent flow by recirculation, the introduction of inert gas, the use of motor driven stirrers and the like may be resorted to. In the drawing the soaking zone is depicted by tower 29 containing a bed of inert packing material 30. Any suitable inert packing material such as, for example, crushed rock, Raschig rings, glass wool, or the like, may be employed. Instead of packing material tower 29 may be equipped with suitable perforated trays, baffles, grids, or the like. Within tower 29 the reaction mixture is maintained at substantially the same temperature as that maintained within the reactor 23. Reactor effluence is maintained in tower 29 for a time sufficient to complete the desired degree of conversion. It has been found that the use of the reactor in combination with a soaker aids in the attainment of unusually high conversions with short periods of contact time assuring efficient operation of the continuous operation. In a preferred method of carrying out the invention the reaction is initiated within the reaction zone and permitted to go to completion within the soaker.

The residence time in each of the zones may vary considerably within the scope of the invention and depends to some extent upon specific operating conditions employed. In general, it has been found that the overall time of residence within the combined reactor 23 and tower 29 in the range of from about 0.5 to about 3 hours and preferably from about 1 to about 2 hours is satisfactory. Under these conditions of maintenance of the reactants within reactor 23 for a time of from about 0.25 to about 1.5 hours and preferably from about 0.5 to about 1.0 and the remainder of the above-indicated overall time in tower 29 is highly satisfactory. Longer or shorter residence time within reactor or soaker may, however, be used in accordance with the invention.

Conditions within reactor 23 and tower 29 are controlled to maintain at least a substantial portion of the contents thereof in the liquid state. Effluence from tower 29 comprising bis-di-(hydroxyphenyl) propane, unconverted phenol, hydrogen chloride and methyl mercaptan are passed through valved line 32 into a separating zone comprising fractionator 33. Within fractionator 33 there is separated a vapor fraction comprising normally gaseous materials including methyl mercaptan, hydrogen chloride, water and some entrained phenol from a liquid fraction comprising bis(hydrophenyl) propane and phenol. The vapor fraction is taken overhead from fractionator 33 through line 34, provided with condenser 35, and introduced into an accumulator 36. In passing through condenser 35 at least a substantial part of the stream flowing through line 34 is condensed. Condensate comprising hydrogen chloride, water and entrained phenol is taken from accumulator 36 by means of valved line 38. A part or all of the condensate flowing through line 38 may be passed through a valved line 39 into a separating zone comprising a fractionator 40. Within fractionator 40 a normally gaseous fraction comprising methyl mercaptan and hydrogen chloride is separated from a liquid fraction comprising phenol, water and hydrogen chloride. The liquid fraction is withdrawn from fractionator 40 by means of valved line 41. Normally gaseous overhead from fractionator 40 is eliminated therefrom by means of valved line 42. A part or all of the normally gaseous stream comprising methyl mercaptan and hydrogen chloride flowing through valved line 42 may be passed through valved line 43 into line 20. Normally gaseous material comprising methyl mercaptan and HCl may be passed directly from accumulator 36 through valved line 45 into line 43. A valved line 46 is provided for eliminating normally gaseous materials from the system.

The liquid fraction comprising phenol and bis(hydroxyphenyl) propane separated in fractionator 33 is passed therefrom through line 50, provided with suitable heating means such as, for example, heat exchanger 51, into a fractionating zone comprising fractionator 52. Within fractionator 52 there is separated a vapor fraction comprising phenol from a liquid fraction comprising bis(hydroxyphenyl) propane. The vapor fraction is passed from fractionator 52 through line 53, provided with condenser 54, into an accumulator 55. Condensate consisting essentially of phenol is forced from accumulator 55 by means of pump 57 through line 58 into line 11.

The liquid fraction separated in fractionator 52 is passed therefrom through valved line 60 into a stripping column 61. Within stripping column 61 the liquid fraction consisting essentially of bis(hydroxyphenyl) propane and traces of unconverted phenol is subjected to a steam stripping operation to strip the last traces of phenol out of the bis(hydroxyphenyl) propane. Overhead from column 61 consisting essentially of water and phenol is passed through line 62 provided with condenser 63 into an accumulator 64.

Bottoms from column 61 consisting essentially of liquefied bis-2,2(4-hydroxyphenyl) propane is passed through line 66 to a flaker 67. High purity bis(hydroxyphenyl) propane consisting essentially of gem-2,2(4-hydroxyphenyl) propane is taken from flaker 67 by means of conduit 68 as a final product.

*Example III*

2,2-bis(4-hydroxyphenyl) propane was produced in a continuous operation by passing a mixture of phenol, dimethyl ketone, hydrogen chloride and methyl mercaptan continuously through two chambers in series maintained at a temperature of 65° C. The mixture was passed through the chambers at a sufficiently rapid rate to maintain a total residence time in the two chambers of 30 minutes. The mixture charged to the reactor contained phenol and dimethyl ketone in a molar ratio of phenol to dimethyl ketone of 10:1. The methyl mercaptan content of the charge was equivalent to 1% (based on the theoretical yield of 2,2-bis(4-hydroxyphenyl) propane. Hydrogen chloride was present in the reaction zone in an amount equal to about 6% by weight. The operation was continued for a period of approximately 8 hours without interruption. The overall yield of the desired 2,2-bis(hydroxyphenyl) propane was equal to 96% of the theoretical yield.

*Example IV*

2,2-bis(4-hydroxyphenyl) propane was prepared in a continuous operation by passing a mixture consisting essentially of phenol, acetone, methyl mercaptan and hydrogen chloride in continuous stream through a reactor provided with a stirrer discharging into a soaking chamber. The soaking chamber was connected in series flow with the reactor. The reactor and soaker were maintained at a temperature of 65° C. The rate of flow through the system was controlled to obtain a residence time of one hour in the reactor and one hour in the soaking chamber. The mixture charged to the reactor contained phenol and dimethyl ketone in the ratio of phenol to dimethyl ketone of 10:1, 1% methyl mercaptan (based on theoretical yield of 2,2-bis(4-hydroxyphenyl) propane), and 6% by weight of hydrogen chloride. 2,2-bis-(4-hydroxyphenyl) propane and unreacted phenol were separated continuously from the effluence from the soaking zone. The phenol separated from the soaking chamber effluence was recycled to the reactor. The operation was continued without interruption for a period of about 104 hours. The overall yield of 2,2-bis(4-hydroxyphenyl) propane was equal to 99% of the theoretical yield.

The invention claimed is:

1. The continuous process for the production of 2,2-bis(4-hydroxyphenyl) propane which comprises, introducing as a continuous stream a mixture comprising phenol, dimethyl ketone, an acid catalyst consisting essentially of a strong mineral acid and a normally gaseous promoter consisting essentially of methyl mercaptan into a reaction zone maintained at a temperature in the range of from about 60° to about 65° C., with a contact time of from about 15 minutes to about 2 hours, said mixture containing a mol ratio of said phenol to said ketone in the range of from about 5.5:1 to about 15:1, thereby reacting phenol with said ketone with the formation of reaction products comprising 2,2-bis(4-hydroxyphenyl) propane in said reaction zone, and continuously withdrawing reaction products comprising 2,2-bis(4-hydroxyphenyl) propane from said reaction zone.

2. The continuous process in accordance with claim 1 wherein said methyl mercaptan is present in said reaction zone in an amount varying from about 0.01% to about 1% by weight based upon theoretical yield of 2,2-bis(4-hydroxyphenyl) propane.

3. The continuous process in accordance with claim 2 wherein said mineral acid is hydrogen chloride.

4. The continuous process for the production of 2,2-bis(4-hydroxyphenyl) propane which comprises introducing as a continuous stream a mixture comprising phenol, dimethyl ketone, an acid catalyst consisting essentially of a strong mineral acid and a normally gaseous promoter consisting essentially of methyl mercaptan into a reaction zone maintained at a temperature in the range of from about 55 to 80° C., with a contact time of from about 15 minutes to about 2 hours, said mixture containing a mol ratio of said phenol to said ketone in the range of from about 5.5:1 to about 15:1 and said methyl mercaptan being present in said reaction zone in an amount varying from about 0.25% to about 1% by weight based upon theoretical yield of 2,2-bis(4-hydroxyphenyl) propane, thereby reacting phenol with said ketone with the formation of reaction products comprising 2,2-bis(4-hydroxyphenyl) propane in said reaction zone, and continuously withdrawing reaction products comprising 2,2-bis(4-hydroxyphenyl) propane from said reaction zone.

5. The continuous process in accordance with claim 4 wherein said strong mineral acid is hydrogen chloride.

6. The continuous process in accordance with claim 5 wherein said methyl mercaptan is present in an amount in the range of from about 0.01 to about 0.5% by weight based upon theoretical yield of 2,2-bis(4-hydroxyphenyl) propane.

7. The continuous process for the production of a bis-(hydroxyphenyl) alkane which comprises introducing as a continuous stream a mixture comprising phenol, an aliphatic ketone, an acid catalyst consisting essentially of a strong mineral acid and a normally gaseous promoter consisting essentially of methyl mercaptan into a reaction zone maintained at a temperature in the range of from about 55° to about 110° C., with a contact time of from about 15 minutes to about 3 hours, said mixture containing a mol ratio of said phenol to said ketone in the range of from about 5.5:1 to about 15:1, thereby reacting phenol with said ketone with the formation of reaction products comprising bis(hydroxyphenyl) alkane in said reaction zone, and continuously withdrawing reaction products comprising bis(hydroxyphenyl) alkane from said reaction zone.

8. The continuous process of claim 7 wherein said methyl mercaptan is present in said reaction zone in an amount in the range of from about 0.01 to about 1% by weight based upon theoretical yield of said bis(hydroxyphenyl) alkane.

9. The continuous process of claim 8 wherein said strong mineral acid is hydrogen chloride.

References Cited in the file of this patent

UNITED STATES PATENTS

| | | |
|---|---|---|
| 1,978,949 | Kohn et al. | Oct. 30, 1934 |
| 2,359,242 | Perkins et al. | Sept. 26, 1944 |
| 2,468,982 | Jansen | May 3, 1949 |
| 2,638,486 | Chiddix et al. | May 12, 1953 |